(12) United States Patent
Mak

(10) Patent No.: US 11,392,010 B2
(45) Date of Patent: Jul. 19, 2022

(54) SPRING SYSTEM AND LENS ANTI-SHAKING DEVICE USING THE SAME

(71) Applicant: VISTA INNOTECH LIMITED, Hong Kong (HK)

(72) Inventor: Lin Chi Mak, Hong Kong (HK)

(73) Assignee: VISTA INNOTECH LIMITED, Hong Kong (HK)

( * ) Notice: Subject to any disclaimer, the term of this patent is extended or adjusted under 35 U.S.C. 154(b) by 248 days.

(21) Appl. No.: 16/800,411

(22) Filed: Feb. 25, 2020

(65) Prior Publication Data
US 2020/0192186 A1   Jun. 18, 2020

Related U.S. Application Data

(63) Continuation of application No. PCT/CN2017/100973, filed on Sep. 8, 2017.

(30) Foreign Application Priority Data

Aug. 25, 2017   (CN) .......................... 201710747616.9

(51) Int. Cl.
*G03B 5/00*   (2021.01)
*G02B 27/64*   (2006.01)

(52) U.S. Cl.
CPC ............. *G03B 5/00* (2013.01); *G02B 27/646* (2013.01); *G03B 2205/0007* (2013.01)

(58) Field of Classification Search
None
See application file for complete search history.

(56) References Cited

U.S. PATENT DOCUMENTS

| 2012/0075519 A1* | 3/2012 | Blasch | G03B 3/10 |
| | | | 348/340 |
| 2013/0208369 A1* | 8/2013 | Lam | G02B 7/04 |
| | | | 359/824 |
| 2013/0215511 A1* | 8/2013 | Wu | H04N 5/23287 |
| | | | 359/554 |

FOREIGN PATENT DOCUMENTS

| CN | 101004533 A | | 7/2007 |
| CN | 101860166 A | | 10/2010 |
| CN | 102934021 B | | 1/2016 |
| CN | 105492952 A | | 4/2016 |
| CN | 206421133 U | * | 8/2017 |
| CN | 206421133 U | | 8/2017 |

(Continued)

OTHER PUBLICATIONS

International Search Report of PCT Patent Application No. PCT/CN2017/100973 dated May 25, 2018.

*Primary Examiner* — Derek S. Chapel

(57) ABSTRACT

A spring system, comprising at least three springs. The centerlines of the at least three springs are not in the same plane, and the centerlines of the springs all pass through the same rotation center. A lens anti-shaking device using the spring system, comprising: a fixing assembly comprising a housing, a positioning base, and a magnet group, the positioning base being disposed on the housing, and the magnet group being disposed on the positioning base; and a movable assembly comprising a coil group, a lens, a lens carrier, an image sensor, and a circuit board, the lens carrier being mounted on the positioning base by means of the spring system, the lens being mounted on the lens carrier, the circuit board being mounted on the positioning base, and the image sensor being disposed on the circuit board.

7 Claims, 13 Drawing Sheets

(56) References Cited

FOREIGN PATENT DOCUMENTS

CN 207867191 U 9/2018

\* cited by examiner

SPRING SYSTEM AND LENS ANTI-SHAKING DEVICE USING THE SAME

CROSS REFERENCE TO RELATED APPLICATIONS

The present application is a Continuation Application of PCT Application No. PCT/CN2017/100973 filed on Sep. 8, 2017, which claims the benefit of Chinese Patent Application No. 201710747616.9 filed on Aug. 25, 2017. All the above are hereby incorporated by reference, the contents of which are incorporated herein by reference in their entirety.

FIELD OF THE INVENTION

The invention relates to a spring system and a lens anti-shaking device using the same.

BACKGROUND OF THE INVENTION

In recent years, small mobile devices with photo-shooting functions are very popular, and their application scope is expanding, including aerial photography, sports cameras and automobile camcorders. Such an existing device includes at least one compact camera module. As a result, the market for such modules is very large, and growth is also rising steadily.

When photos and videos are taken, the photos and videos taken by mobile devices are likely to be blurred or shaken due to external vibrations, affecting quality of the photos and videos. These problems are more serious when the vibration is more intense, or in low light conditions. In order to solve these problems, many small anti-shaking devices have appeared in the market. Among them, it is the most effective to compensate image blur and shake due to vibration by mechanical methods to improve image quality. The mechanical methods may comprise translating a group of lenses through an anti-shaking actuator, or rotating a group of lenses and image sensors, to achieve an anti-shaking effect. The anti-shaking effect of rotary mechanical methods is generally better than that of translational mechanical methods.

A rotary anti-shaking actuator needs such a mechanical structure that a movable structure such as a lens or an image sensor is with multi-axis rotation degrees-of-freedom. At the same time, in order to mitigate the impact of external forces caused by acceleration in different directions or gravity on the movable structure in an actuator, the mechanical structure is usually required to have no translational degrees-of-freedom. In addition, the mechanical structure needs to have good shockproof so as to be able to withstand dropping that may occur during normal use of small mobile devices.

An optical unit with a shake correction function is disclosed in Chinese patent application No. 201180028200.2. In the optical unit with a shake correction function, permanent magnets are provided at a plurality of locations, which are disposed at intervals on the outer peripheral surface of the movable assembly, i.e. the camera unit, in the circumferential direction of the optical axis L, a sheet-shaped coil integrally having a plurality of coil portions which extend in the circumferential direction and are opposite to the permanent magnets is provided in the fixed body. In the sheet-shaped coil, since the terminal portion faces the outside on the side opposite to the permanent magnets, the coil portions can be easily electrically connected.

A lens driving device is disclosed in Chinese patent application No. 201480037511.9, which comprises a fixed component including a base frame; a movable assembly including a lens barrel; a set of magnets surrounding the movable assembly; three sets of coils; and a spring system, which is attached between the movable assembly and the fixed component and configured to support the movable assembly and form a suspension system to allow the movable assembly to move along the orthogonal first, second and third axes. The lens barrel is configured to carry the lens unit, the third axis is parallel to the optical axis of the lens unit, and the first and second axes are perpendicular to the third axis, respectively.

The disadvantages of the above technical solutions lie in that: the non-linear friction force appears in the movement of the ball actuator, which affects the anti-shaking effect; conventional springs cannot achieve a condition that there is only rotation degrees-of-freedom without translational degrees-of-freedom, and have poor shockproof; in addition, the actuator performance is easily affected by external forces.

SUMMARY OF THE INVENTION

With regard to the aforementioned disadvantages, a spring, a spring system and a lens anti-shaking device using the spring system are provided in the present invention, which are with features of simple structure, low cost, light weight, small volume, only rotation degrees-of-freedom, without translational degrees-of-freedom, and good shockproof.

In order to achieve the aforementioned objectives, in one aspect, a spring system is provided in the present invention, which comprises at least three springs; centerlines of the at least three springs are not in the same plane, and the centerline of each of the springs passes through the same rotation center.

In the present invention, a plurality of springs are disposed to be inclined relative to each other and are substantively distributed on the side of a circular platform. The centerline of each spring passes through the same rotation center. In this solution, the centerline of the spring refers to a line passing through the center point of the cross section of a first connecting portion and the center point of the cross section of a second connecting portion. In this solution, the rotation center refers to a range region, the range of which is ⅕ or less of the length of a spring connecting arm. In this solution, the maximum distance Dmax between the centerline of a spring and the edge of the spring may be adjusted according to different use situations. Correspondingly, the distance D between the centerline of a spring and the edge of the spring ranges from ⅓ or less of the length of the entire connecting arm.

According to another embodiment of the present invention, the spring comprises a head end, a tail end, and a connecting arm; the head end is provided with a first connecting portion, and the tail end is provided with a second connecting portion; one end of the connecting arm is connected to the head end through the first connecting portion, and the other end of the connecting arm is connected to the tail end through the second connecting portion.

According to another embodiment of the present invention, the connecting arm is a sheet-shaped connecting arm. The sheet-shaped connecting arm may be either a regular-shaped connecting arm, or an irregular-shaped connecting arm.

According to another embodiment of the present invention, the connecting arm is a wave-shaped connecting arm.

The wave-shaped connecting arm may have different bending directions depending on different use situations.

According to another embodiment of the present invention, the connecting arm is a rod-shaped connecting arm. The rod-shaped connecting arm may be either a regular-shaped connecting arm, or an irregular-shaped connecting arm.

According to another embodiment of the present invention, the head end and the tail end are each provided with a positioning component, and the positioning component may be a positioning slot or a positioning hole. The head end and the tail end are mechanically connected to an external structure and an internal structure respectively, achieving a fixed connection through the positioning component. During the use of the springs, there will be no relative displacement where the springs are connected with the external structure.

In another aspect, a lens anti-shaking device using the aforementioned spring system is provided in the present invention, which comprises: a fixing assembly comprising a housing, a positioning base, and a magnet group, wherein the positioning base is disposed on the housing and the magnet group is disposed on the positioning base; a movable assembly comprising a coil group, a lens, a lens carrier, an image sensor, and a circuit board; wherein the lens carrier is mounted on the positioning base through the spring system, the lens is mounted on the lens carrier, the circuit board being mounted on the positioning base, and the image sensor is provided on the circuit board; the coil group is disposed outside of the lens carrier corresponding to the magnet group.

In the present invention, the spring system connects the fixing assembly and the movable assembly. When the movable assembly moves, it has only rotation degrees-of-freedom, no translational degrees-of-freedom, which is achieved through the spring system.

According to another embodiment of the present invention, an optical axis of the lens passes through a rotation center. The position of the gravity center of the movable assembly is also in the optical axis of the lens. The position of the rotation center overlaps the position of the gravity center of the movable assembly, so as to reduce the torque to the rotation center caused by gravitational force or acceleration in different directions, thereby reducing unnecessary rotation of the movable assembly.

According to another embodiment of the present invention, the spring system comprises 3 to 8 springs which are disposed at intervals in the circumferential direction of the optical axis of the lens. Preferably, there are 4 springs.

According to another embodiment of the present invention, the springs are conductive springs. A conductive material is provided in the conductive springs to realize electrical connection between the fixing assembly and the movable assembly.

In the present invention, when an external force acts on the movable assembly, the spring system can divide the external force into force components which are parallel to the centerlines of the springs in the spring system. In the spring system, the spring has a larger stiffness coefficient of axial displacement, and the displacement $\Delta X$ produced by the axial deformation of the spring is much smaller than the deformation caused by bending deformation, that is, $\Delta X$ is smaller. The displacement component produced by each force component is small, so that the total displacement is small. In other words, when an external force in any direction acts on the movable assembly, the spring system will nearly not cause displacement of the movable assembly due to its large stiffness coefficient of displacement. Correspondingly, in the spring system, the springs have relatively small stiffness coefficients of rotation, therefore, when the spring system is driven by an external force or torque, the movable assembly would rotate around the rotation center without displacement.

In the present invention, when an external force acts on the movable assembly, the connecting arm of each of the springs bears a force which is substantively parallel to the centerline of the spring. The maximum bending stress that the spring system withstand is small, so the spring system can survive under forces in a larger range that may occur and act on the movable assembly in the process of dropping, so that too much stress that exceeds the yield strength of the spring and plastic deformation are not easy to appear, thereby achieving good shockproof.

In the present invention, by changing the current intensities and directions of the coil groups, the magnetic torques of the multi-axis rotation degrees-of-freedom can be changed, and the movable assembly (including the lens and the image sensor) can rotate around the rotation center in the spring system, and the position of the rotation center will not be moved translationally during movement. When the rotation of the movable assembly relative to the fixing assembly has an opposite direction to the direction of external rotation and vibration, and has a similar amplitude with the external rotation and vibration, the vibration will be eliminated to achieve the anti-shaking effect and reduce the impact of vibration on video and image quality.

The advantages of the present invention lie in that:
1. It is achieved that there is only rotation degrees-of-freedom, substantively no translational degrees-of-freedom;
2. The spring system according to the present invention has good shockproof, and increases reliability when dropping;
3. The movable assembly is highly adaptable, and is less affected by acceleration in different directions or gravitational force;
4. According to the present invention, a non-linear friction force is not generated, and the anti-shaking performance is better; and
5. The spring system according to the present invention has features of low manufacturing cost, light weight and small size.

The present invention will be further described in detail below with reference to drawings.

DETAILED DESCRIPTION OF PREFERRED EMBODIMENTS

Embodiment 1 (A Spring and a Spring System)

Figure 1:
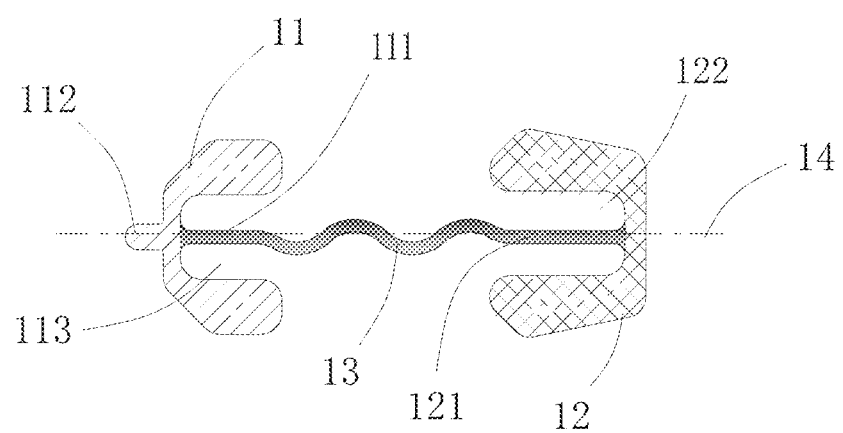
FIG. 1 is a schematic diagram of an overall structure of a spring according to Embodiment 1, which shows a section A-A.
Figure 2:
FIG. 2 is a schematic structural diagram of the spring according to Embodiment 1.
Figure 3:
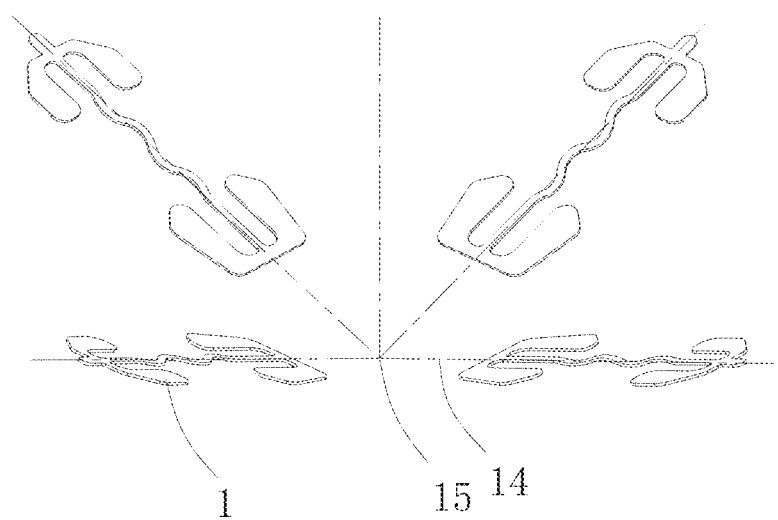
FIG. 3 is a schematic structural diagram of a spring system according to Embodiment 1.

A spring and a spring system using the spring are provided in the embodiment. Refer to FIGS. 1 to 3. In the embodiment, the spring system comprises springs 1, and there are four springs. The spring 1 comprises a head end 11, a tail end 12, and a connecting arm 13; wherein the head end 11 is provided with a first connecting portion 111, and the tail end 12 is provided with a second connecting portion 121. The connecting arm 13 is a wave-shaped connecting arm. One end of the connecting arm 13 is connected to the head end 11 through the first connecting portion 111, and the other end of the connecting arm 13 is connected to the tail end 12 through the second connecting portion 121.

Refer to FIG. 1. The head end 11 has a convex plate shape, and is provided with a positioning foot 112 for installation. The head end 11 is provided with a first notch 113 at a position corresponding to the first connecting portion 111. The tail end 12 has a concave plate shape; and correspondingly, the tail end 12 is provided with a second notch 122. The wave-shaped elastic connecting arm is a sheet-like structure as a whole. The wave-shaped elastic connecting arm is arranged along a plane parallel to the head end 11 and the tail end 12. As shown in FIG. 1, the spring has a sheet-like shape as a whole.

Refer to FIG. 3. Centerlines 14 of the four springs are not in the same plane, and the centerline 14 of each of the springs passes through the same rotation center 15. Accordingly, the four springs 1 are disposed at intervals.

Embodiment 2 (A Spring and a Spring System)

Figure 4:
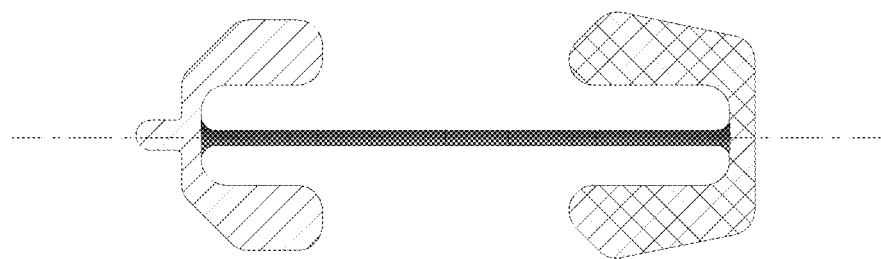
FIG. 4 is a schematic diagram of an overall structure of a spring according to Embodiment 2, which shows a section B-B.
Figure 5:
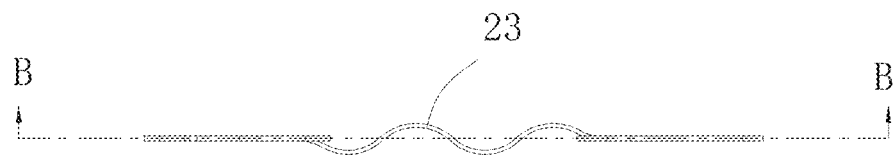
FIG. 5 is a schematic structural diagram of the spring according to Embodiment 2.
Figure 6:
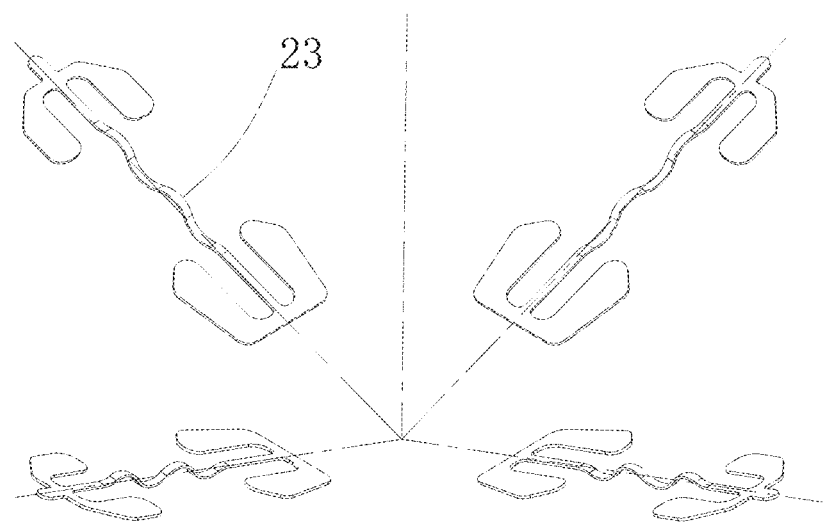
FIG. 6 is a schematic structural diagram of a spring system according to Embodiment 2.

As shown in FIGS. 4 to 6, the differences between this embodiment and Embodiment 1 lie in that the elastic connecting arm 23 has a sheet-like structure as a whole, and the wave-shaped elastic connecting arm is disposed in a direction perpendicular to the plane where the head end and the tail end are located.

Embodiment 3 (A Spring and a Spring System)

Figure 7:
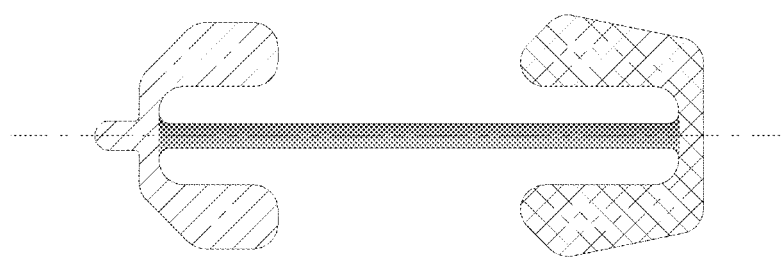
FIG. 7 is a schematic diagram of an overall structure of a spring according to Embodiment 3, which shows a section C-C.
Figure 8:
FIG. 8 is a schematic structural diagram of the spring according to Embodiment 3.
Figure 9:
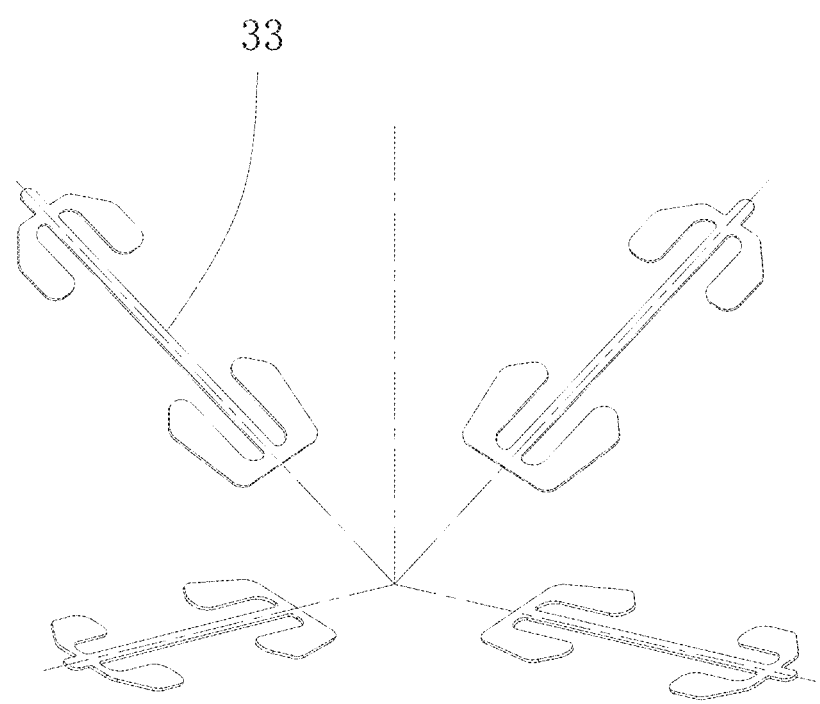
FIG. 9 is a schematic structural diagram of a spring system according to Embodiment 3.

As shown in FIGS. 7 to 9, the difference between this embodiment and Embodiment 1 lies in that the elastic connecting arm 33 is a rectangular sheet-shaped elastic connecting arm.

Embodiment 4 (A Spring and a Spring System)

Figure 10:
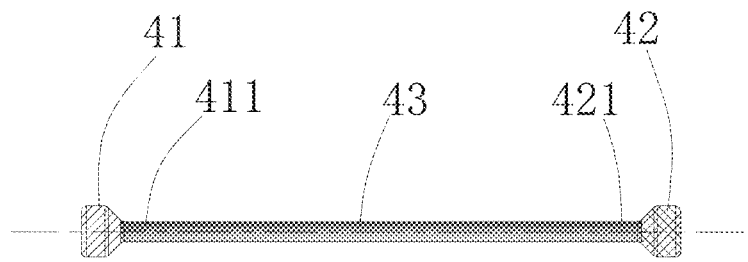
FIG. 10 is a schematic diagram of an overall structure of a spring according to Embodiment 4, which shows a section D-D.
Figure 11:
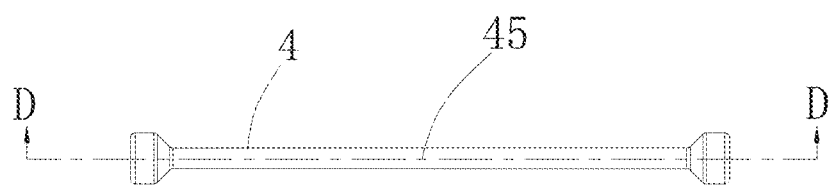
FIG. 11 is a schematic structural diagram of the spring according to Embodiment 4.
Figure 12:
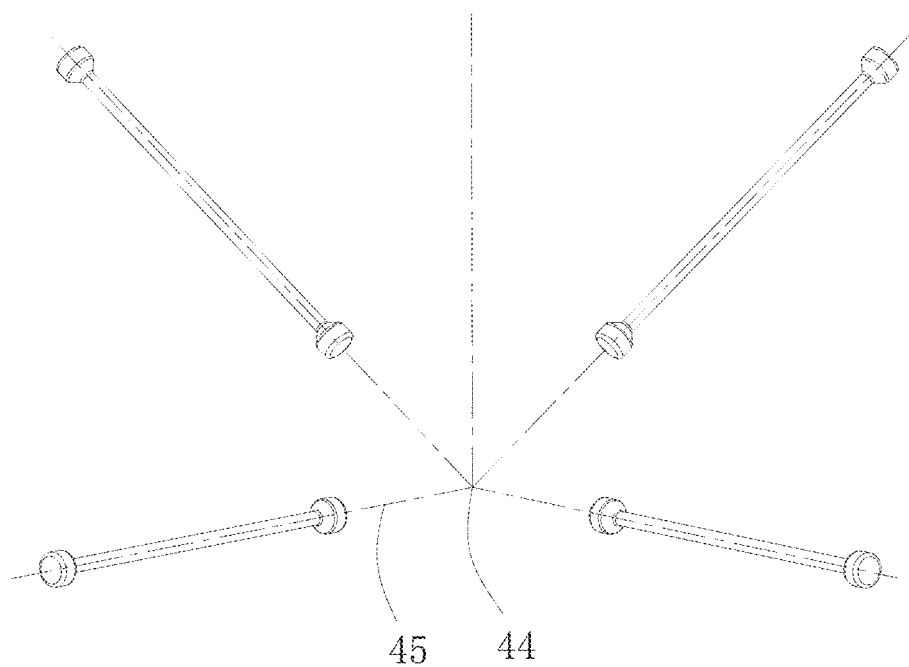
FIG. 12 is a schematic structural diagram of a spring system according to Embodiment 4.
Figure 13:
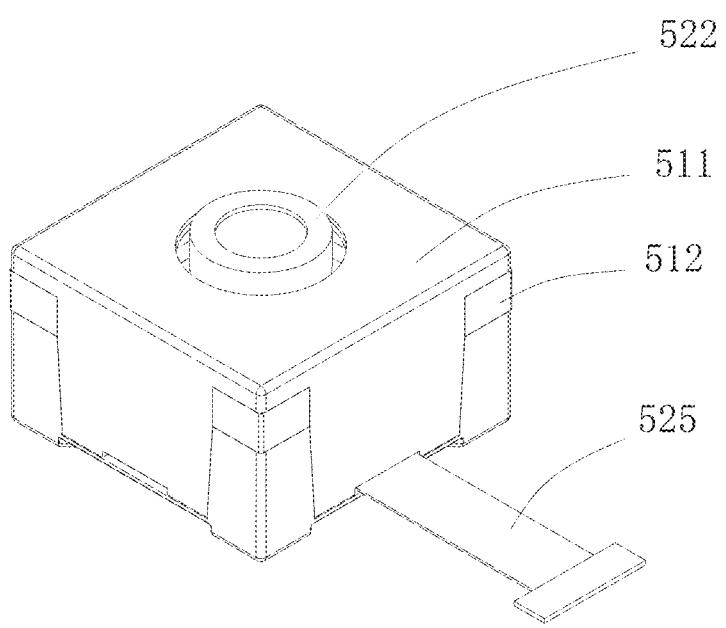
FIG. 13 is a schematic diagram of an overall structure of a lens anti-shaking device according to Embodiment 5.
Figure 14:
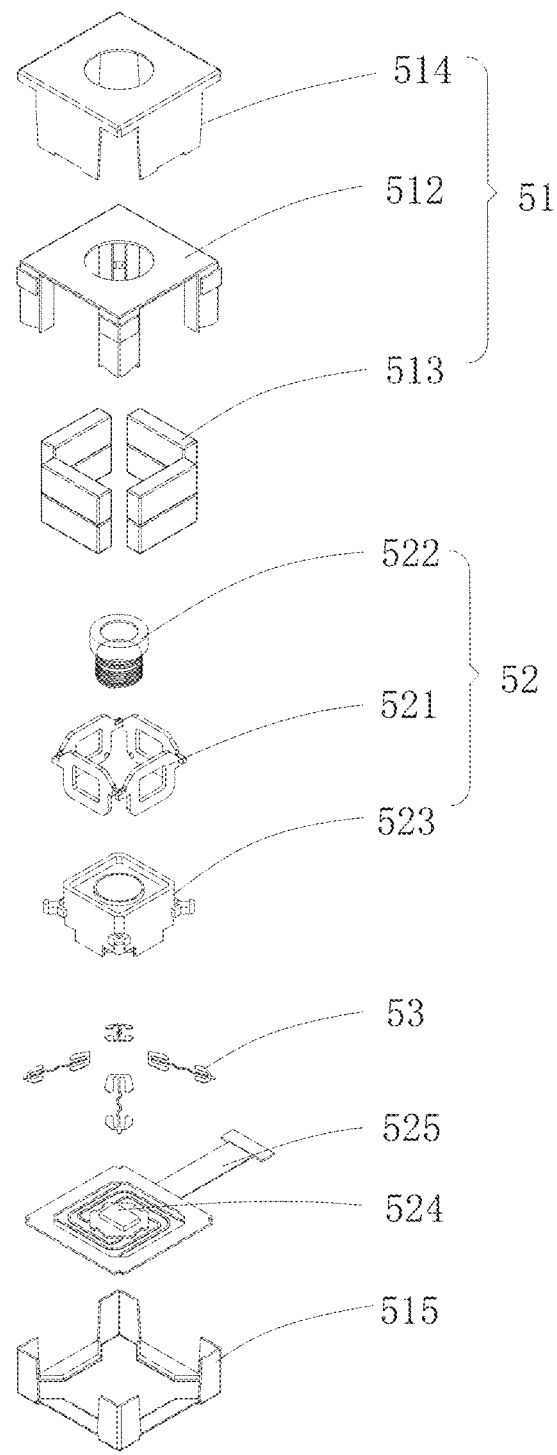
FIG. 14 is an exploded schematic diagram of the lens anti-shaking device according to Embodiment 5.
Figure 15:
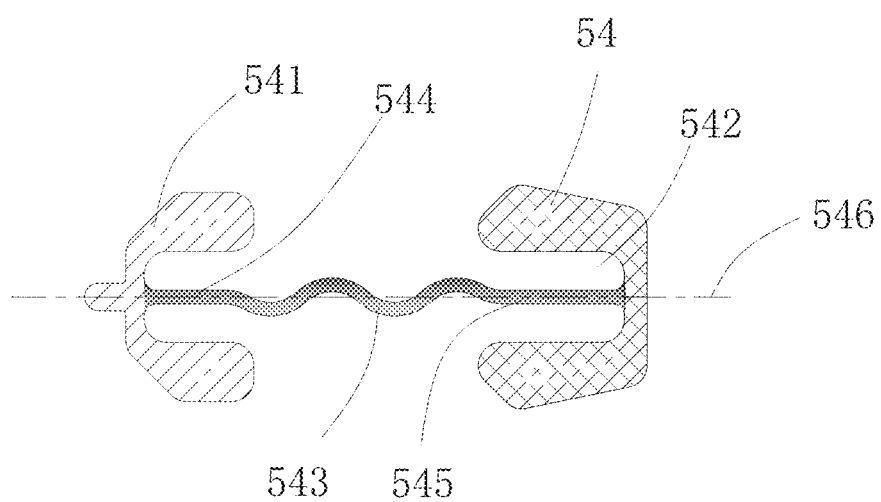
FIG. 15 is a schematic structural diagram of a spring of the lens anti-shaking device according to Embodiment 5.
Figure 16:
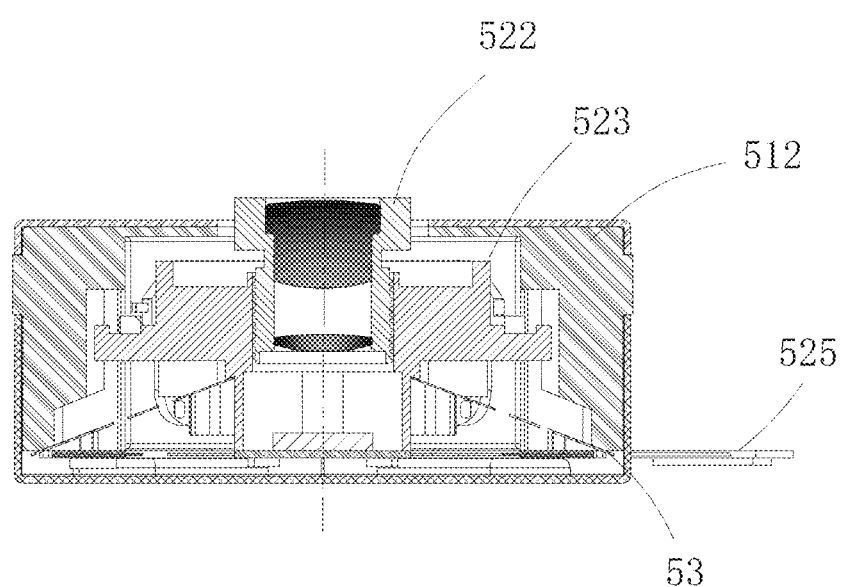
FIG. 16 is a schematic partial cross-sectional view of the lens anti-shaking device according to Embodiment 5.

A spring and a spring system using the spring are provided in the embodiment. Refer to FIGS. 10 to 12. In the embodiment, the spring system comprises springs 4, and there are four springs. Each of the springs 1 comprises a head end 41, a tail end 42, and a connecting arm 43; wherein the head end 41 is provided with a first connecting portion 411, and the tail end 42 is provided with a second connecting portion 421. The connecting arm 43 is a rod-shaped connecting arm. One end of the connecting arm 43 is connected to the head end 41 through the first connecting portion 411, and the other end of the connecting arm 43 is connected to the tail end 42 through the second connecting portion 421.

Refer to FIG. 11. The spring 4 is in the shape of a marble pillar as a whole. The head end 41 is a cylindrical platform, and a chamfer is provided at a position where the head end 41 is connected to the first connecting portion 411. The tail end 42 is a cylindrical platform, and accordingly, a chamfer is also provided at a position where the tail end 42 is connected to the second connecting portion 421. As shown in FIG. 12, Centerlines 45 of the four springs are not in the same plane, and the centerline 45 of each of the springs passes through the same rotation center 44. Accordingly, the four springs 4 are disposed at intervals.

Embodiment 2 (A Lens Anti-Shaking Device)

A lens anti-shaking device is provided in the embodiment. Refer to FIGS. 13 to 17, the lens anti-shaking device comprises a fixing assembly 51, a movable assembly 52, and a spring system 53. The fixing assembly 51 comprises a housing 511, a positioning base 512, and a magnet group 513. The housing 511 comprises an upper housing 514 and a lower housing 515. The positioning base 512 is disposed on the housing 511, and the magnet group 513 is disposed on the positioning base 512. The movable assembly 52 comprises a coil group 521, a lens 522, a lens carrier 523, an image sensor 524, and a circuit board 525. The lens carrier 523 is mounted on the positioning base 512, the lens 522 is mounted on the lens carrier 523, the circuit board 525 is mounted on the positioning base 512, and the image sensor 524 is provided on the circuit board 525. The coil group 521 is disposed outside of the lens carrier 523 corresponding to the magnet group 513. The spring system 53 is provided on the positioning base 512, and comprises four springs 54. The spring 54 comprises a head end 541, a tail end 542, and a connecting arm 543. The head end 541 is provided with a first connecting portion 544, and the tail end 542 is provided with a second connecting portion 545. One end of the connecting arm 543 is connected to the head end 541 through the first connecting portion 544, and the other end of the connecting arm 543 is connected to the tail end 542 through the second connecting portion 545. Centerlines 546 of the four springs are not in the same plane, and the centerline 546 of each of the springs passes through the same rotation center. The rotation center is provided in the optical axis of the lens 522, and overlaps the position of the gravity center of the movable assembly. The four springs 54 are provided at intervals in the circumferential direction of the optical axis of the lens 533. The springs 54 may be conductive springs.

Centerlines 546 of the four springs are not in the same plane, and the centerline 546 of each of the springs passes through the same rotation center. The rotation center is provided in the optical axis of the lens 522, and overlaps the position of the gravity center of the movable assembly. The four springs 54 are provided at intervals in the circumferential direction of the optical axis of the lens 533. The springs 54 may be conductive springs Refer to FIG. 16. In this embodiment, the rotation center is close to the gravity center of the movable assembly 52, which reduces the torque to the rotation center caused by gravitational force or acceleration in different directions, thereby reducing unnecessary rotation of the movable assembly 52.

Figure 17:
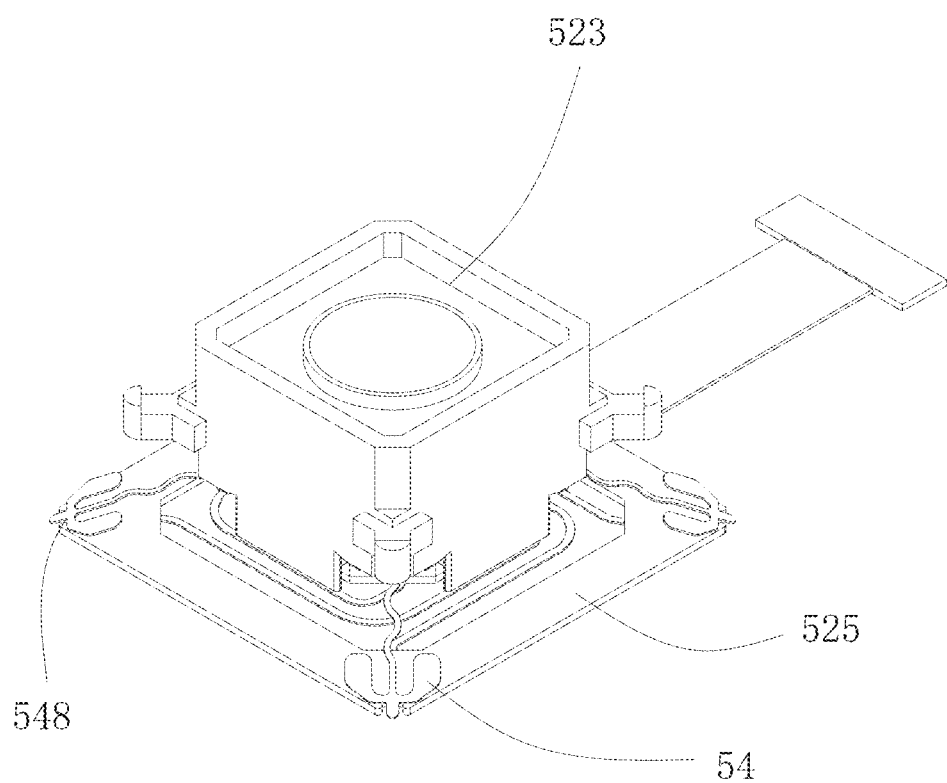
FIG. 17 is a schematic partial structural diagram of the lens anti-shaking device according to Embodiment 5.

Refer to FIG. 17. The spring system 53 is installed between the lens carrier 523 and the circuit board 525, and the circuit board 525 is provided with positioning grooves 548 matching the springs 54 at a corresponding position to the spring system. Correspondingly, the lens carrier is also provided with a mechanism for positioning to achieve tight connection between mating parts.

In this embodiment, by changing the current intensities and directions of the coil group, the magnetic torque of the multi-axis rotation degrees-of-freedom can be changed, and the movable assembly (including the lens and the image sensor) can rotate around the rotation center in the spring system, and the position of the rotation center will not be displaced during movement. When the rotation of the movable assembly relative to the fixing assembly has an opposite direction to the direction of external rotation and vibration, and has a similar amplitude with the external rotation and vibration, the vibration will be eliminated to achieve the anti-shaking effect and reduce the impact of vibration on video and image quality.

In this embodiment, when an external force acts on the movable assembly, the spring system can divide the external force into force components which are parallel to the centerlines of the springs in the spring system. In configuration of the spring system, the springs have larger stiffness coefficients of axial displacement, and the displacement $\Delta X$ produced by the axial deformation of the spring is much smaller than the deformation caused by bending deformation, that is, $\Delta X$ is smaller. The displacement component produced by each force component is small, so that the total displacement is small. In other words, when an external force in any direction acts on the movable assembly, the spring system will not cause displacement of the movable assembly due to its large stiffness coefficient of displacement. Correspondingly, in the spring system, the springs have relatively small stiffness coefficients of rotation, therefore, when the spring system is driven by an external force, the movable assembly would rotate around the rotation center without displacement.

In this embodiment, when an external force acts on the movable assembly, the connecting arm of each of the spring withstands a force which is substantively parallel to the centerline of the spring. The maximum bending stress that the spring system can bear is small, so the spring system can offset a force in a larger range that may occur and act on the movable assembly in the process of dropping, so that too much stress which exceeds the yield strength of the spring and plastic deformation are not easy to appear, thereby achieving good shockproof.

In this embodiment, in the movement of the movable assembly, the non-linear friction force does not appear in the spring system, which results in an anti-shaking effect.

Although the present invention is disclosed as above with the preferred embodiments, it is not intended to limit the scope of the present invention. Any ordinary person skilled in the art can make some improvements without departing from the scope of the present invention, that is, any equivalent improvement made in accordance with the present invention should fall within the scope of the present invention.

What is claimed is:

1. A lens anti-shaking device, wherein the lens anti-shaking device comprises:
    a spring system comprising at least three springs, centerlines of the at least three springs being not in the same plane, the centerline of each of the at least three springs passing through the same rotation center, each of the at least three springs comprising a head end, a tail end, and a connecting arm, the head end being provided with a first connecting portion, the tail end being provided with a second connecting portion, one end of the connecting arm being connected to the head end through the first connecting portion, and the other end of the connecting arm being connected to the tail end through the second connecting portion, the at least three springs being disposed to be inclined relative to each other, and a distance D between the centerline of each of the at least three springs and an edge of each of the at least three springs being in a range of ⅓ or less of a length of the entire connecting arm;
    a fixing assembly comprising a housing, a positioning base, and a magnet group, the positioning base being disposed on the housing and the magnet group being disposed on the positioning base; and
    a movable assembly comprising a coil group, a lens, a lens carrier, an image sensor, and a circuit board; the lens carrier being mounted on the positioning base through the spring system, the lens being mounted on the lens carrier, the circuit board being mounted on the positioning base, and the image sensor being provided on the circuit board, the coil group being disposed outside of the lens carrier corresponding to the magnet group, an optical axis of the lens passing through the rotation center, a position of a gravity center of the movable assembly being in the optical axis of the lens, and a position of the rotation center overlapping the position of the gravity center of the movable assembly,
    wherein, by changing current intensities and directions of the coil groups, the movable assembly is capable of rotating around the rotation center without displacement.

2. The lens anti-shaking device according to claim 1, wherein the connecting arm is a sheet-shaped connecting arm.

3. The lens anti-shaking device according to claim 1, wherein the connecting arm is a wave-shaped connecting arm.

4. The lens anti-shaking device according to claim 1, wherein the connecting arm is a rod-shaped connecting arm.

5. The lens anti-shaking device according to claim 1, wherein the head end and the tail end are each provided with a positioning component.

6. The lens anti-shaking device according to claim 1, wherein the spring system comprises 3 to 8 springs which are provided at intervals in a circumferential direction of the optical axis of the lens.

7. The lens anti-shaking device according to claim 1, wherein the at least three springs are conductive springs.

* * * * *